(No Model.)
J. E. PETERSON.
CORN CUTTING IMPLEMENT.
No. 443,055. Patented Dec. 16, 1890.
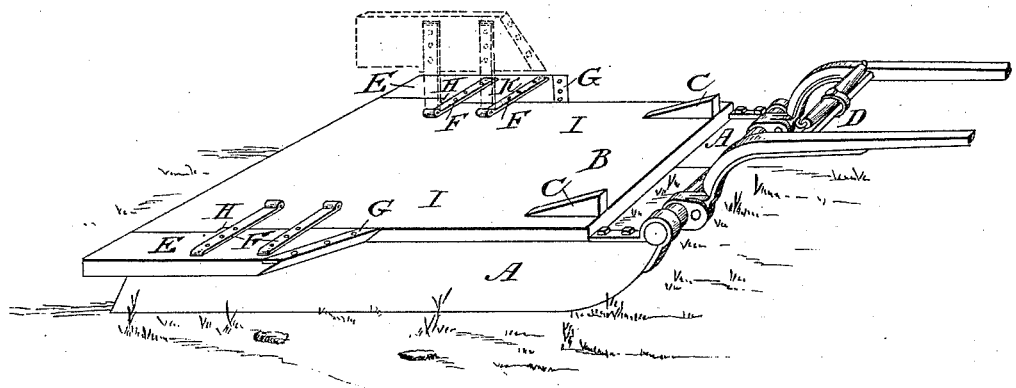
Witnesses:
Walter Allen
William E. Knight
Inventor:
Jonathan E. Peterson
By Knight Bros
Attorneys

UNITED STATES PATENT OFFICE.

JONATHAN E. PETERSON, OF NEAR WEST MANSFIELD, OHIO.

CORN-CUTTING IMPLEMENT.

SPECIFICATION forming part of Letters Patent No. 443,055, dated December 16, 1890.

Application filed July 13, 1887. Serial No. 244,219. (No model.)

*To all whom it may concern:*

Be it known that I, JONATHAN E. PETERSON, a citizen of the United States, and a resident of near West Mansfield, in the county of Logan and State of Ohio, have invented a new and useful Corn-Cutting Implement, of which the following is a specification.

My invention is a new corn-cutting machine or implement.

The figure is a perspective view.

A A represent a pair of sled-runners; B, the top of the sled; C C, beveled pieces on the front of the sled; D, the shafts; E, wings or shelves carrying the cutting-knives and forming supports for the operators to stand on and also support for the ends of the cut corn; F F, the hinges of the wings, whereby the latter are rigidly attached to the sled-platform as to their sidewise movement. These hinges consist of long plates or bars, their unusual length being necessary to provide a means for arresting the downward movement of the extension below the sled-platform.

G G represent the knives; H H, offset in top of sled, against the rear end of which a shoulder on the wing rests to brace the wing against the force or resistance offered to the knife by the standing corn.

The object of my invention is to provide a simple and effective device for cutting standing corn. For this purpose I mount the knives G on the wings projecting beyond the edges of the sled-runners A. The runners are placed at proper distance apart to run between two rows of corn and so that the corn will come in contact with the knives as the sled progresses.

The cutter may be used to cut either one or two rows, but is designed to cut two in practice. In cutting one row only one operator is on the sled; but in cutting two rows two operators stand on the sled, one on each side, facing outward.

The operators stand on top of the sled, one on each side, each with one foot on the wing at the point marked K and one foot on the sled at the point marked I, and receive the stalks in their arms as they are cut, the butts resting on the sled and wing, until the sled reaches the shocking point—say every twelve hills apart—when they step off the sled and deposit the stalks against the shock or gallows, raise the wings E until the sled passes the shock, drive on, letting the wings fall again as soon as the shock is passed, and the operation is repeated. The rear end of the inside of the wing is cut away, leaving a square shoulder that fits into the offset in the top of the sled and rests against it, the offset forming a brace to prevent the wing being loosened or broken off.

The sled in practice being close to the ground, only some eight or ten inches high, brings the knives into position to cut at a point where the stalk is not liable to bend out of the way, the stalk being less liable to bend near the ground than it would farther up. The pressure of the knife only bends the stalk sufficient to give an angling cut. The knives are also set at an angle receding from the front of the sled, which, together with the bend in the stalk, gives the knife the advantage of a shear cut.

As the knives cut the stalks off some six or eight inches from the ground, the wings ride upon the ends of the green stubs sticking up out of the ground, the stubs in a great part supporting the weight of the operator and cut corn on the wing, thus lightening the load on the runners, while the juice that oozes out of the ends of the stubs soon renders the bottoms of the wings so slippery that they slide easily over them, greatly reducing the draft and enabling one horse (or even a pony, as has been found in practice) to haul the machine with little effort.

I make my device with no projecting parts on the side and in front of the wing, as any projections outside and in front of the knife, whatever the slant thereof, would be apt to tear down the gallows or strike the shock before the wing and knife are ready to be thrown up; also, were there any projecting parts beneath the wing the progress of the sled would be obstructed by the stubs of the cut corn.

What I claim is—

1. The vehicle A, having the platform B, the hinged wings E on either side of the platform, the knives G on said wings, the offsets H on the platform, and the projecting shoulders on the wings adapted to fit the offsets, as and for the purpose set forth.

2. The combination, with the vehicle, of horizontally-projecting hinged wings and cutting-knives mounted on their front ends, said hinged wings forming a platform for the support of the operator and of the cut corn directly in rear of the knives.

3. The combination of the vehicle, the horizontally-projecting wings hinged thereto, forming a platform for the operator to stand on and having their front ends inclined toward the rear from the front inner corners, and cutting-knives mounted on the inclined front ends of said wings, as described.

4. In a corn-cutting machine, the combination of a sled having a platform, side extensions hinged thereto adapted to support the operators and cut corn, cutting-knives mounted on the front ends of the hinged extension, and means for arresting or limiting the downward movement of the extensions below the sled-platform, substantially as set forth.

5. The combination, with a vehicle having cutting-knives at its sides, of the platform-top and side-extension platforms (for the operator and cut corn to stand on) without obstructions to prevent the free handling of the standing or cut corn by the operator, as and for the purpose set forth.

6. A corn-cutting machine having a platform to support the operator and the cut stalks and a knife mounted on the platform in front of the operator's stand, said platform being clear of all projections in front, above or at the side which would prevent the operator from gathering all the standing or down stalks within his reach and presenting them to the knife, or which would interfere with his movements on the platform.

7. A corn-cutting machine consisting of a vehicle provided with laterally-projecting platforms to carry the operators and cutting knives secured to the extreme front ends of the platforms, the platforms being clear of all obstructions in front, underneath, or above which could interfere with the operator in handling the corn.

JONATHAN E. PETERSON.

Witnesses:
W. J. HAMLIN,
S. J. SOUTHARD.